(12) United States Patent
Brown et al.

(10) Patent No.: US 9,348,031 B2
(45) Date of Patent: May 24, 2016

(54) DELAYED GEOTAGGING

(75) Inventors: James Brown, Laguna Beach, CA (US); Makarand Phatak, Sunnyvale, CA (US); William Kerry Keal, Santa Clara, CA (US)

(73) Assignee: CSR TECHNOLOGY HOLDINGS INC., San Jose, CA (US)

( * ) Notice: Subject to any disclaimer, the term of this patent is extended or adjusted under 35 U.S.C. 154(b) by 591 days.

(21) Appl. No.: 12/917,279

(22) Filed: Nov. 1, 2010

(65) Prior Publication Data
US 2012/0105279 A1 May 3, 2012

(51) Int. Cl.
*G01S 19/42* (2010.01)
*G01S 19/14* (2010.01)
*G01S 19/27* (2010.01)

(52) U.S. Cl.
CPC ............... *G01S 19/42* (2013.01); *G01S 19/14* (2013.01); *G01S 19/27* (2013.01)

(58) Field of Classification Search
CPC ....................................................... G01S 19/27
USPC ............. 342/357.46, 357.52, 357.63, 357.77, 342/357.66
See application file for complete search history.

(56) References Cited

U.S. PATENT DOCUMENTS

| | | | | |
|---|---|---|---|---|
| 5,506,644 | A * | 4/1996 | Suzuki et al. | 396/319 |
| 5,768,640 | A * | 6/1998 | Takahashi et al. | 396/310 |
| 5,828,336 | A | 10/1998 | Yunck et al. | |
| 6,567,712 | B1 * | 5/2003 | Rog et al. | 700/56 |
| 7,551,126 | B2 * | 6/2009 | Loomis et al. | 342/357.46 |
| 8,228,230 | B1 * | 7/2012 | Capozio | 342/357.66 |
| 2004/0117114 | A1 * | 6/2004 | Diggelen | 701/213 |
| 2006/0208943 | A1 * | 9/2006 | Gronemeyer | 342/357.12 |

(Continued)

FOREIGN PATENT DOCUMENTS

| CN | 101147081 | | 3/2008 |
|---|---|---|---|
| CN | 101853027 | A | 10/2010 |

(Continued)

OTHER PUBLICATIONS

Zhang et al, "GPS Velocity and Acceleration Determination using the Broadcast Ephemeris," The Journal of Navigation (2006), 59, 293-305.*
European Search Report issued May 11, 2012 in correspond EP case.
Marshall, Chris, "Geotagging with GPS: Capture and Process", Geotate Autogeotagging, Sep. 19, 2008, pp. 1-25.

(Continued)

*Primary Examiner* — Gregory C Issing
(74) *Attorney, Agent, or Firm* — The Marbury Law Group, PLLC

(57) ABSTRACT

Various methods, apparatuses, and systems for providing a delayed geotag using GPS devices are described. The GPS device includes a wireless receiver configured to receive satellite state data and satellite range measurements from a plurality of satellites, a communications interface in communication with a media device, and a position engine configured to calculate a geotag. The GPS device can be configured to receive satellite range measurements from one or more satellites at a first point in time when the satellite state data for a minimum number of the satellites is unavailable, and to calculate the satellite state data at that time using satellite state data received at a second, later point in time. The satellite state information at the first point in time is calculated using an algorithm to extrapolate the satellite state data back to the first point in time when the satellite range measurements were made. The GPS device can calculate a geotag using the calculated satellite state data at the first point in time and the corresponding satellite range measurements.

23 Claims, 5 Drawing Sheets

(56) References Cited

U.S. PATENT DOCUMENTS

| | | | |
|---|---|---|---|
| 2006/0257122 A1* | 11/2006 | Yule et al. | 386/107 |
| 2007/0247354 A1* | 10/2007 | Garin | 342/357.03 |
| 2008/0111738 A1* | 5/2008 | Han | 342/357.12 |
| 2009/0231192 A1* | 9/2009 | van Diggelen et al. | 342/357.15 |
| 2009/0234571 A1* | 9/2009 | Riben et al. | 701/200 |
| 2010/0198512 A1 | 8/2010 | Zhang | |

FOREIGN PATENT DOCUMENTS

| | | | | |
|---|---|---|---|---|
| EP | 2063284 A2 * | 5/2009 | | G01S 1/00 |
| GB | 2463481 A * | 3/2010 | | G03B 17/24 |
| WO | WO 2010/009924 | 1/2010 | | |

OTHER PUBLICATIONS

"Using the GPS: Recording Positional Information to Pictures", Nikon User's Manual, Nikon P6000 (or similar), 2008, pp. 61-64.

"Displaying GPS Information", Richo User's Manual: G700SE (or similar), Nov. 2010, pp. 185-190.

"Sony: Handycam: How to Use GPS"; User's Manual, 2009, pp. 1-8.

Cong, et al., "Design and Simulation of JTIDS/BA/INS/GPS Combined Navigation Processor Software", Journal of Astronautics, vol. 29, No. 4, Jul. 31, 2008, pp. 1-6 (Chinese language article with English abstract on p. 6).

Search Report issued Sep. 13, 2013 in corresponding Chinese matter.

European Search Report—EP11187186—Search Authority—Munich—May 21, 2012.

* cited by examiner

DELAYED GEOTAGGING

FIELD OF THE INVENTION

At least certain embodiments of the invention relate generally to geotagging media, and more particularly, but not exclusively, to providing a delayed geotag at times when a full geotag cannot be promptly calculated.

BACKGROUND

Geotagging is the process of adding Global Positioning System (GPS) location data to photographs or other media, enabling users to easily and accurately know where in the world the media was captured. For example, a geotag can be added to a photograph to show the location of the photograph at the time it was taken. Geotags can be added to any media format such as photographs, video, websites, SMS messages, and RSS feeds. A geotag associates a particular location with the media at the time it was generated. Among other things, geotagging can help users find a wide variety of location-specific information. Geotagging-enabled devices and services can also be used to find location-based news, websites, or other resources.

Geotags are metadata that can be associated with media data. A full geotag is a geotag that contains geographic data—such as latitude and longitude—capable of specifying GPS device position (and optionally velocity, altitude, orientation, accuracy, and heading), as well as the position of any device attached to, or in the vicinity of, the GPS device. The metadata format built into most modern digital cameras and wireless telephones supports the inclusion of this location data. For example, image files such as JPEG have standard ways of embedding location information into the metadata, via either EXIF (Exchangeable Image File Format) or XMP (Extensible Metadata Platform) standard formats. With photographs stored in JPEG file format, for example, the geotag information is embedded in the metadata. The common fields within the EXIF format for geotag data are GPSLatitude, GPSLongitude, and GPSAltitude. The metadata can also store custom data. An example readout for a JPEG photograph might look like:

GPS Latitude: 57 deg 38' 56.83" N
GPS Longitude: 10 deg 24' 26.79" E

Most image management and viewing tools are now capable of recognizing geotags.

The GPS location data of geotags is determined using a GPS device. Modern handheld devices such as digital cameras, mobile phones, and PDA devices may be equipped with built-in GPS receivers or may be configured for use with a GPS card or other plug-in GPS device. GPS receivers determine their position by computing time delays between transmission and reception of signals transmitted from satellites and received by the receiver on or near the surface of the earth. The time delays multiplied by the speed of light provide a measure of range from the GPS receiver to each of the satellites that are in view of the receiver. GPS satellites transmit to the receivers both satellite-positioning data called "ephemeris" data and unique pseudo-random noise (PN) codes that identify the particular satellite and allow signals transmitted simultaneously from several satellites to be received simultaneously by a GPS receiver with very little interference of any one signal by another. The PN code sequence length is 1023 chips, corresponding to a 1 millisecond time period. One cycle of 1023 chips is called a PN frame. Each received GPS signal is constructed from the 1.023 MHz repetitive PN pattern of 1023 chips. At very low signal levels, the PN code pattern may still be observed to provide unambiguous time delay measurements, by processing, and essentially averaging, many PN frames. These measured time delays multiplied by the speed of light are called "pseudoranges." These measured pseudoranges are included in information that becomes part of a partial geotag. It should be noted that the term pseudorange is the range plus the GPS receiver clock bias (with respect to GPS time) multiplied by the speed of light; however, for the sake of brevity and convenience, the terms range and pseudorange can be used interchangeably. In addition, satellite ephemeris data can also include almanac data, which is a reduced accuracy version of ephemeris data that provides reduced position accuracy. A set of four measured pseudoranges, when combined with knowledge of the absolute times of transmission of the GPS signals and respective satellite state at those times is sufficient to solve for the position of the GPS receiver. But the process of searching for and acquiring GPS signals and reading the ephemeris data for a plurality of satellites is time consuming and may introduce unacceptable delays in computing the receiver position. In addition, in many situations, there may be blockage of the satellite signals. In these cases, the received signal level can be too low to demodulate and derive the satellite data without error.

Media devices, such as digital cameras, often spend much of their time idle, and in locations where GPS reception is sporadic and signals are often too weak to decode the transmitted data stream from one or more satellites. Under these conditions, even with the application of various low power operating modes, the GPS receiver will often be unable to compute a position fix without a noticeable delay. Yet users often want a media device to be ready to capture a particular form of media instantly, at or very near the time when the media device is powered on. In many cases, the media will be captured indoors or in other severe environments where the ability to acquire strong GPS signals is limited. In such a case, the satellite state data, or ephemeris data, may not be available to compute a full geotag at the time the media is captured, or within a reasonably short amount of time later. In addition, the user may subsequently turn off the media device before the GPS receiver has been able to acquire the ephemeris data. The user may want a geotag immediately, but the GPS device is unable to provide one. Current GPS receivers have no way to resolve this problem, so the media will not be geotagged. The inability of GPS receivers to provide fast location fixes in severe environments without the need for assistance from a network, and to do so without excessively draining the device battery, have been obstacles to integrating geotagging with media devices.

SUMMARY

A variety of improved methods, apparatuses, and systems for providing a geotag using a GPS device are described. The GPS device can include a wireless receiver configured to receive satellite state data and satellite range measurements from a plurality of satellites, a communications interface in communication with a media device, and a position engine to calculate GPS device position. In at least certain embodiments, the position engine can be configured to receive satellite range measurements for a minimum number of satellites at a first point in time when satellite state data for the minimum number of satellites is unavailable, and to calculate GPS device position at that time using satellite state data received at a second, later point in time. The satellite state data at the first point in time may be calculated using an algorithm that extrapolates the satellite state data back to the first point in time when the satellite range measurements were made.

BRIEF DESCRIPTION OF THE DRAWINGS

For a better understanding of at least certain embodiments, reference will be made to the following Detailed Description, which is to be read in conjunction with the accompanying drawings, wherein.

DETAILED DESCRIPTION

Figure 1:
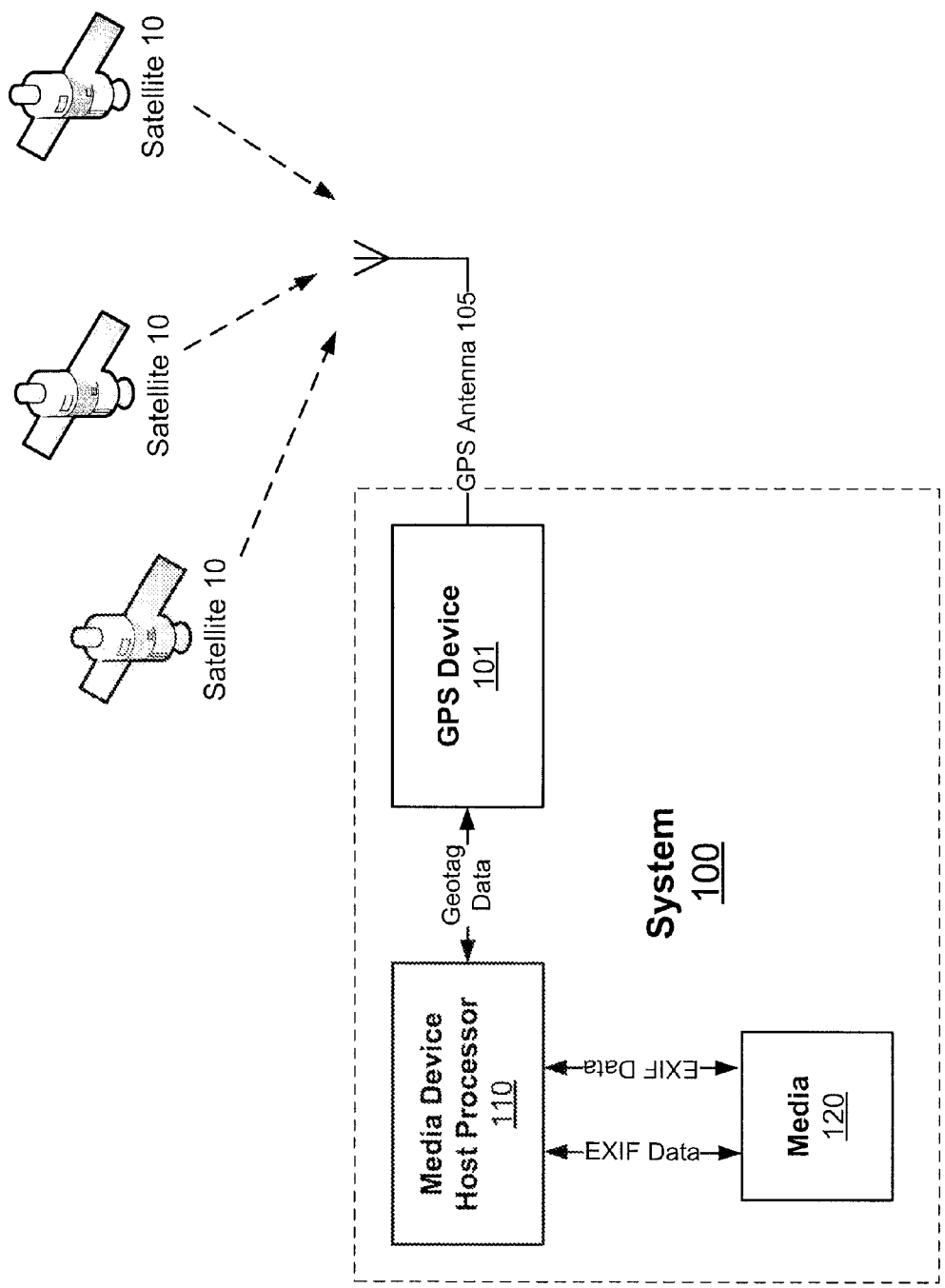
FIG. 1 depicts an illustrative block diagram of a system for providing a geotag to a media device according to one embodiment of the invention.

Throughout the description, for the purposes of explanation, numerous specific details are set forth in order to provide a thorough understanding of the present invention. It will be apparent to one skilled in the art, however, that the present invention may be practiced without some of these specific details. In other instances, well-known structures and devices are shown in block diagram form to avoid obscuring the underlying principles of embodiments of the invention.

Various embodiments of methods, apparatuses and systems for providing a delayed geotag using a GPS device are described. Under certain conditions, a GPS receiver will often see enough weak signals to compute a position fix if it had the necessary satellite state data. If satellite measurements (and receiver time) for a minimum number of satellites are stored as a partial geotag, it is possible to make use of the satellite state data that becomes available up to 3 days in the future or more to calculate a full geotag depending on the level of accuracy deemed acceptable for a particular application. Satellite state information may include satellite position, velocity, clock bias, status information, and clock drift with respect to the GPS clock. This satellite state information is included within the satellite ephemeris data. A partial geotag refers to any information needed to create a full geotag at a later point in time, except that it lacks the satellite state information from a minimum number of satellites. Partial geotags may include any of the following information: (1) pseudorange measurements from a minimum number of satellites required to calculate a full geotag; (2) satellite state information from less than the minimum number of satellites required to calculate the full geotag; (3) GPS time of measurement based on internal GPS clock; (4) Quality of Service; or (5) certain additional device position information. A full geotag can be calculated from a partial geotag when the satellite state data becomes available for a minimum number of satellites. That is, a full geotag can be calculated using new satellite state data with old satellite range measurements recovered from the partial geotag.

These GPS devices may include a wireless receiver configured to receive satellite state data and satellite range measurements from a plurality of satellites, a communications interface in communication with a media device, and a position engine to determine the position of the GPS device. In at least certain embodiments, the GPS device can be configured to receive satellite range measurements from a minimum number of satellites at a first point in time when the satellite state data for the minimum number of satellites is unavailable, and to use satellite state data received at a second, later point in time to extrapolate the back to the first point in time when the satellite range measurements were made. The GPS device then calculate a full geotag using the calculated satellite state data at the first point in time and the corresponding satellite range measurements.

A GPS receiver configured according to these embodiments eliminates the problems that plague current geotag implementations by ensuring fast and accurate position fixes and long battery life; and by using reverse extended ephemeris (EE) technology to quickly convert stored partial geotags into full geotags in cases where poor signal conditions prevent acquisition of satellite ephemeris data for a minimum number of satellites required to compute a position fix. This reverse EE technology can be used with media devices to accurately geotag media, even under conditions where the satellite ephemeris data cannot be acquired within a certain amount of time. FIG. 1 depicts a block diagram of a system for providing a geotag to a media device according to one embodiment. System 100 includes a GPS device 101 having one or more antennas 105 for receiving broadcast signals from one or more satellites 10. In this illustrative embodiment, the GPS device 101 is coupled with a media device host processor 110. The GPS device 101 is configured to receive satellite signals and to calculate geotag data to be transmitted to a media device for geotagging media. The GPS device 101 can be coupled with media device host processor 110 through any connection, as this is not germane to the techniques discussed herein. For example, GPS device 101 can be coupled with media device host processor 110 through any direct or indirect physical interconnection such as a bus, USB connection, physical connection, logical connection, or a wired or wireless network of any type. In addition, the media device host processor 110 may be on a stand-alone media device coupled with the GPS device over a network or other connection, such as a USB connection for example, or the media host processor 110 may be incorporated into a combination GPS receiver and media device using a physical interconnection within the device, such as a bus. The GPS device 101 may also be built into the combination media and GPS device, or contained on a GPS card to be inserted into or otherwise connected by a user to the combination device. The illustrated embodiment further includes media 120 coupled with media device host processor 110. Media 120 can be any type of media.

Geotags are provided from the GPS device 120 to the media device host processor 110. In turn, the media device host processor 110 can associate the geotag with a particular media 120 by embedding it into the metadata fields of the media 120, via the EXIF standard for example, as shown in the illustrated embodiment. However, other embodiments are contemplated including the development of proprietary storage mechanisms instead of EXIF format. When signal conditions permit, the GPS receiver 101 can acquire both the raw pseudorange measurements and the current satellite ephemeris data (satellite state data), and can calculate a full geotag to be provided to the media device host processor 110. But when signal conditions do not permit the GPS receiver 101 to acquire the satellite ephemeris data for a minimum number of satellites, it may be possible for the GPS receiver 101 to at least acquire the minimum number of satellite range measurements and to use those range measurements to calculate a full geotag at a later point in time when the satellite ephemeris data for the minimum number of satellites becomes available.

Figure 2:
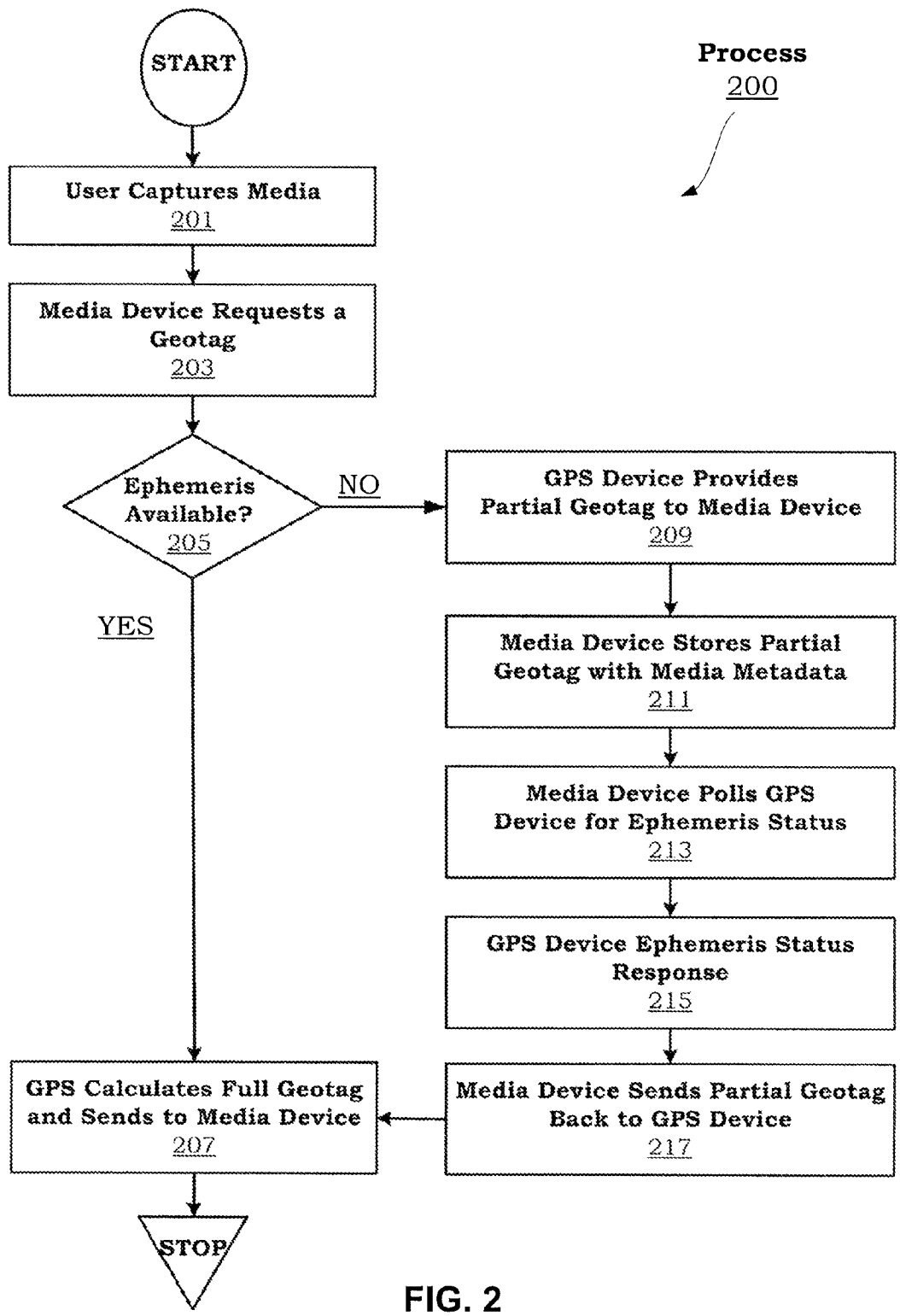
FIG. 2 depicts an illustrative flow chart of a process for calculating a full geotag according to one embodiment of the invention.

FIG. 2 depicts a flow chart of a process for calculating a full geotag according to one illustrative embodiment of the invention. Process 200 begins at operation 201 where a media device, such as a digital camera, captures an instance of media. The instance of media can be anything from a photograph to an RSS news feed, etc. The instance of media is to be associated with a geotag according to this embodiment, and so the media device sends a request to a GPS device to provide a geotag (operation 203). As discussed above, the media device may be coupled with the GPS device through any connection or network such as a direct bus interconnection in hardware or a wireless Internet connection, as examples. Additionally, the GPS device and media device may be part of the same unit, or multiple components within the same or different units or systems.

In response to the media device request, the GPS device attempts to provide a full geotag to the media device to be associated with the instance of media within the media device. At operation 205, it is determined whether satellite ephemeris data for a minimum number of satellites is available. As discussed above, under certain conditions the satellite ephemeris data may not be available such as indoors or in certain harsh environments where satellite signals may be blocked. In these conditions, it may not be possible to obtain the satellite ephemeris data within a certain period of time. In some embodiments, this amount of time may be predetermined or preset within the GPS device, or it may be provided to the GPS device from the media device, etc. Generally, it is desirable to minimized the amount of time necessary to acquire the satellite signals for battery power conservation purposes or to avoid user frustration, etc. Later, when signal conditions permit the GPS device to acquire the satellite ephemeris data needed to calculate a full geotag, the GPS device can perform the calculation and provide the full geotag to the media device (operation 207).

In certain conditions, the satellite ephemeris data may not be available for a minimum number of satellites, but the satellite range measurements for the minimum number of satellites can still be measured. That is, there are conditions where the satellite ephemeris data may not be available but where the raw satellite range measurements are. When signal conditions do not permit the GPS device to acquire the satellite ephemeris data within a certain amount of time, the GPS device can only provide the raw pseudoranges and partial satellite state data to the media device (operation 209). In such a case, the GPS device provides a partial geotag instead, and the media device stores the partial geotag with the media within the media device (operation 211). The media device is configured to store both the full and partial geotags with the associated instance of media. In the preferred embodiment, the partial geotag data is stored in the media device rather than the GPS receiver. Since various media such as photographs are stored on removable media within a media device, it is advantageous for the media device to store the geotag information along with its associated instance of media to better keep track of which instance of media is to be associated with a particular geotag and vice versa. In addition, if the geotag data is stored on the media device, then it can be removed and replaced at the same time as the associated media is removed and replaced. However, embodiments are not so limited as the geotag information can also be stored at the GPS device and synched with the geotag on the media device at certain intervals.

Additionally, the media device may be configured to distinguish between full and partial geotags based on message identifiers received from the GPS device. When the GPS device sends a full geotag to the media device, the GPS device may be configured to send a message identifier with the full geotag to notify the media device that a full geotag is being provided. Alternatively, the GPS device may be configured to send a different message identifier when providing only a partial geotag to the media device. In such an embodiment, the media device determines whether it received a full or partial geotag based on the type of message identifier received with the geotag information. But the invention is not so limited, as other mechanisms for distinguishing between a full and partial geotag may be used and are contemplated.

When the media device receives only a partial geotag, the media device can be configured to continuously poll the GPS device to determine whether the GPS device has obtained the satellite ephemeris data and can provide the full geotag to the media device (operation 213). In one embodiment, the polling is performed by sending ephemeris status signals to the GPS device and receiving ephemeris status response signals in response. The GPS receiver could also pro-actively alert the media device that new satellite state data has become available. Once the signal conditions permit the GPS device to acquire the satellite ephemeris data at a later point in time, it is downloaded into the GPS device, and subsequently the GPS device notifies the media device with a positive ephemeris status response signal (operation 215), and the media device subsequently sends the partial geotag stored with the instance of media back to the GPS device for the full geotag calculation. Having the satellite range measurements, less than the minimum amount of ephemeris data (e.g., from some or none of the satellites) at the point in time the instance of media was captured, and ephemeris data at a later point in time, the GPS device can calculate a full geotag and provide it to the media device (operation 207). This completes process 200 according to an illustrative embodiment.

Figure 3:
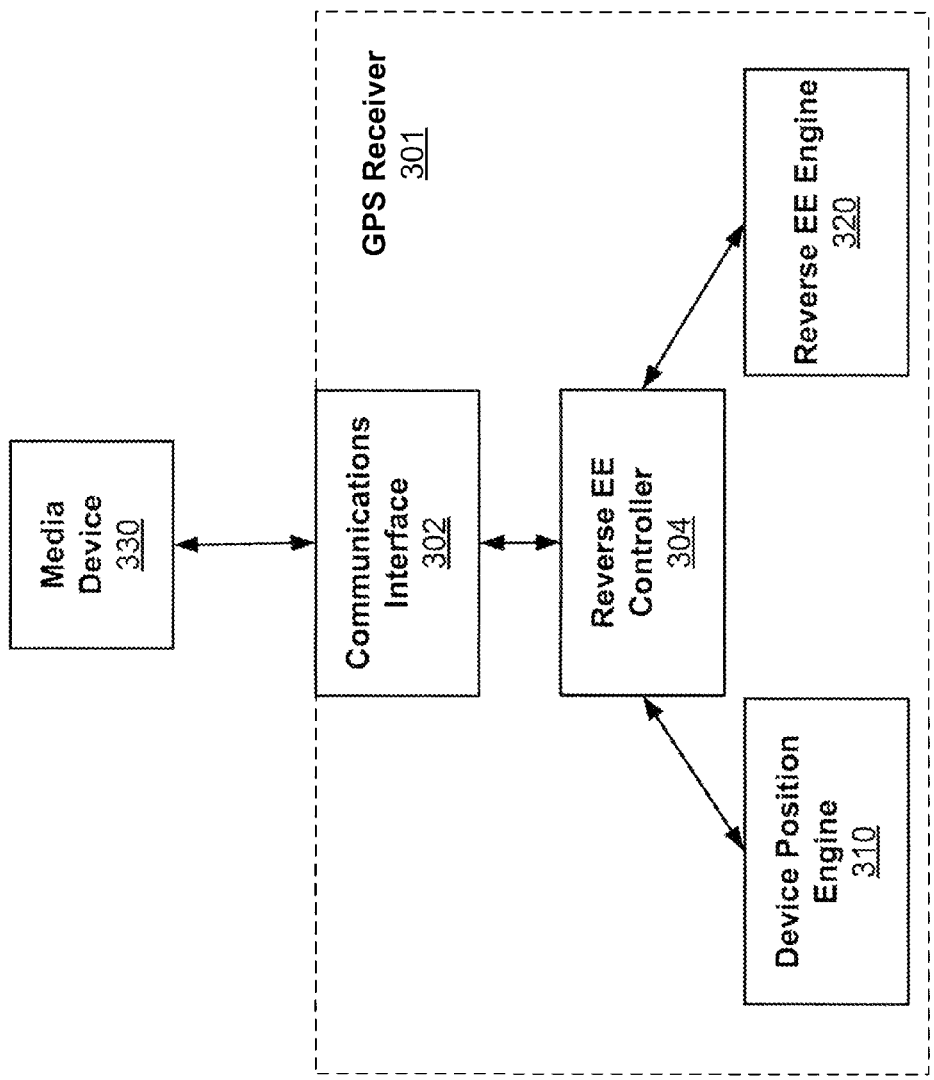
FIG. 3 depicts an illustrative block diagram of a system for providing a delayed geotag to a media device according to one embodiment of the invention.

In at least certain embodiments, the calculation of the full geotag from the partial geotag is performed using a reverse extended ephemeris (EE) algorithm to extrapolate the satellite state data back in time to the first point in time when the satellite range measurements were taken, but the satellite ephemeris was unavailable. From the current satellite state data, the state of the satellite at an earlier time can be determined using the reverse EE algorithm. FIG. 3 depicts a block diagram of a system for providing a delayed geotag to a media device according to one embodiment. In this illustrative embodiment, a GPS receiver 301 is coupled with a media device 330 through a communications interface 302. As discussed above, the connection between the GPS receiver 301 and media device 330 can be any direct or indirect connection. In addition, the connection can be through one or more intermediary components or connections, including through multiple networks. The type or proximity of the connection between the media device 330 and the GPS receiver 301 are not germane to the techniques described herein. In this embodiment, the GPS receiver 301 also includes a reverse EE controller 304 coupled with both a device position engine 310 and a satellite state engine, referred to in the figure as a reverse EE engine 320. The reverse EE controller 304 is configured to receive a partial geotag from the media device 330 and to send it to the reverse EE engine 320 to calculate the satellite state at the time when the partial geotag was measured. For example, if the media device is a digital camera, the reverse EE engine 320 is configured to calculate the state of the satellites at the point in time when a particular photograph was taken. The partial geotag includes the measurements made when the photograph was taken along with any other available satellite state information. The reverse EE engine 320 applies a reverse EE algorithm to calculate the satellite state information at the previous point in time based on satellite ephemeris data acquired at a later point in time when the instance of media was generated. In one embodiment, the reverse EE algorithm is given by the formula:

$$P_n = 2*P_{n-1} - P_{n-2} + T^2 \sum_{k=0}^{K} w_k * a_k \text{ and}$$

$$V_{n-1} = -\left(P_n - P_{n-1} - T^2 \sum_{k=0}^{K} d_k\right)\bigg/T,$$

where,
P stands for position,
V stands for velocity,
a stands for acceleration,
w and d stand for coefficients in a suitable multi-step method of numerical integration such as but not limited to a variant of Stoermer-Cowell,
K is order of order of numerical integration method,
T is time step, and suffix k corresponds to time index which in the reverse EE is given by:

$P_n \rightarrow P(t=t_0-nT), P_{n-1} \rightarrow P(t=t_0-(n-1)T), P_{n-2} \rightarrow P(t=t_0-(n-2)T),$ $a_0 \rightarrow a(t=t_0-(n-1)T), a_1 \rightarrow a(t=t_0-(n-2)T), \ldots, a_K \rightarrow a(t=t_0-(n-K-1)T),$ where,
$t_0$ is the second, later point in time.

The accelerations "a" are position dependent and are obtained from a detailed model of the gravity of the earth, gravity of the moon and the sun and other terms of forces that act on satellite. The starting satellite state of position and velocity is obtained from satellite ephemeris data acquired at the second later point in time. From the starting state, K accelerations and 2 positions required in the above multi-step method formula are obtained from a single-step method such as, but not limited to, Runga-Kutta-Nystorm. The above formula will not in general give satellite state at the first earlier time at which pseudorange measurements were made and in the end a partial time step is needed as follows:

$$P_r = r*P_n + (1-r)*P_{n-1} + (-r*T^2) * \sum_{k=0}^{K} d_k * T^k * (1-r^{k+1}) \text{ and}$$

$$V_r = V_{n-1} - r*T \sum_{k=0}^{K} d_k * r^k(k+2)$$

where r specifies the required fractional step in the end to the first earlier time. Satellite clock bias and drift with respect to GPS time are obtained using satellite clock model coefficients acquired along with the satellite ephemeris data using a standard polynomial evaluation as given in the GPS ICD 200 document.

The reverse EE engine 320 can then pass the calculated satellite state data back to the reverse EE controller 304, which can subsequently send the satellite state information to the device position engine 310. In other embodiments, the reverse EE engine 320 can pass the calculated satellite state data directly to the device position engine 310. The device position engine 310 can then calculate a full geotag based on the satellite state data and corresponding satellite range measurements taken at the point in time when the instance of media was generated. The calculation of full geotag can be done using any standard GPS receiver position calculation such as a weighted least squares, wherein some (at least one) satellite position and velocity can be obtained using the reverse EE algorithm above. The reverse EE controller 304, reverse EE engine 320, and device position engine 310 may be implemented in hardware, software, firmware, or combination thereof, including a hybrid circuit. In addition, these components may be implemented using special-purpose hardware circuitry configured to perform the techniques described herein such as processors, microcontrollers, ASICs, FPGAs, PLDs, or any other hardwired logic; or may be implemented using general-purpose hardware programmed with software or firmware, or any combination thereof, to perform these techniques. In addition, the reverse EE controller 304, reverse EE engine 320, and device position engine 310 may be included within a single component or module and simply referred to as a position engine, or can be included within multiple components or modules, as shown in the illustrated embodiment, for example.

Figure 4:
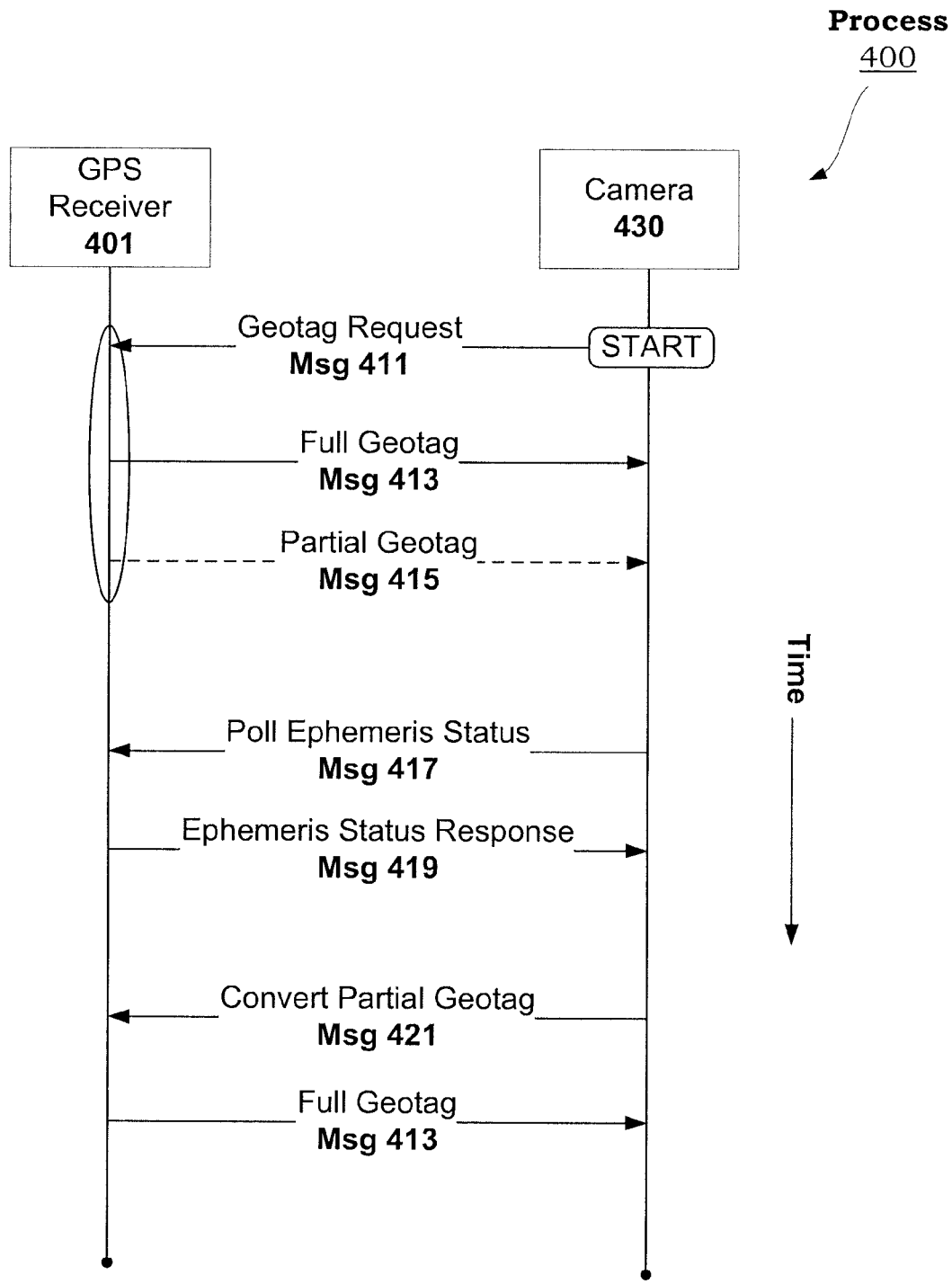
FIG. 4 depicts an illustrative timing diagram of a system for providing a delayed geotag to a media device according to one embodiment of the invention.

A timing diagram of the above process is shown in FIG. 4. This figure depicts an illustrative timing diagram of a system for providing a delayed geotag to a media device according to one embodiment. In this illustrative embodiment, the media device is digital camera 430, which is coupled with GPS receiver 401 to communicate signals therebetween over a connection, which can be any direct or indirect connection as discussed above. Process 400 begins with the digital camera 430 sending a geotag request (message 411) to the GPS receiver 401. In at least some embodiments, this is in response to a user taking a digital photograph. GPS receiver responds by providing either a full geotag when satellite state data for a minimum number of satellites is available (message 413), or only a partial geotag when satellite state data for the minimum number of satellites is unavailable (message 415). In at least certain embodiments satellite range measurements for providing a partial geotag may be available, while the satellite state data for the minimum number of satellites is not. In response to receiving messages 413 and 415 respectively, digital camera 430 can distinguish whether it received a full or partial geotag based on message identification data included within each message. When the digital camera 430 determines it has received a full geotag, it associates that information with the digital photograph and the process 400 completes. The digital camera 430 may then store the full geotag with the associated digital photograph in memory. In one embodiment, as described above, the full geotag will be stored within the metadata of the digital photograph.

If, on the other hand, the digital camera 430 determines it has only received a partial geotag, in at least certain embodiments, digital camera 430 begins polling the GPS receiver 401 for the status of the satellite ephemeris data (messages 417) at various configurable intervals of time. Digital camera 430 also stores the partial geotag with the associated digital photograph in its memory. Upon reception of poll ephemeris status, GPS receiver provides an ephemeris status responses (messages 419), which indicate whether the ephemeris data has yet been received. At a later time when the GPS receiver subsequently receives the satellite ephemeris data, the GPS receiver 401 sends a positive ephemeris status response to the digital camera 430, and in response digital camera 430 sends a convert partial geotag (message 421) along with the partial geotag stored in its memory back to the GPS receiver 401. The GPS receiver then can compute a full geotag based on the partial geotag received back from the digital camera 430 and the satellite ephemeris data received at the later time. This may occur in one or more steps. For example, if the partial geotag lacks four ephemerides but the receiver has received only one ephemeris, the partial geotag may be updated with this information and re-stored on the digital camera 430. It may take up to four of these updates before the full geotag can be calculated. In certain embodiments, this is accomplished using the reverse EE algorithm described above. GPS receiver then sends the computed full geotag to the digital camera 430 (message 413), which then stores the full geotag with the associated digital photograph in memory. In one embodiment, the full geotag is stored within the digital photograph's metadata as discussed above. This completes process 400 according to one illustrative embodiment.

Figure 5:
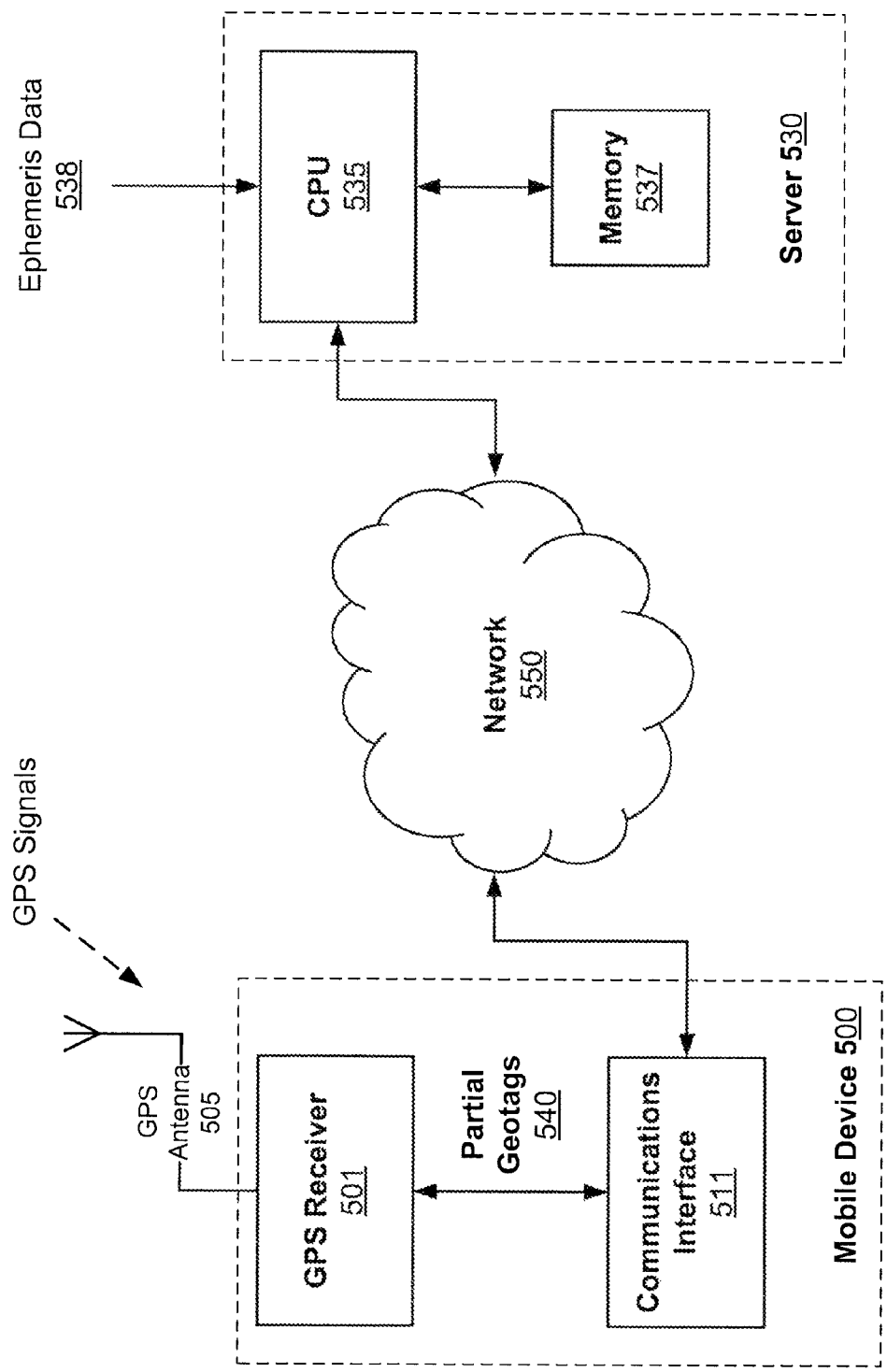
FIG. 5 depicts an illustrative block diagram of a system for providing a delayed geotag to a media device using a server according to one embodiment of the invention.

Additional methods used to calculate the full geotags are contemplated to be within the scope of this description. For example, a related term "geocoding" refers to the process of taking non-coordinate based geographical identifiers, such as a street address, and finding associated geographic coordinates (or vice versa for reverse geocoding). Such techniques can be used together with geotagging to provide alternative search techniques. In addition, calculating the full geotags is not strictly required to be performed by the GPS device. For example, the full geotags can also be calculated at a remote server. FIG. 5 depicts a block diagram of a system for providing a delayed geotag to a media device using a server according to one embodiment. In this illustrative embodiment, a mobile device 500 including a GPS receiver 501 and communications interface 511 is coupled to a server 530 via a network 550. GPS receiver 501 includes one or more GPS antennae 505 coupled to receive satellite GPS signals. In cases when signal conditions do not permit the GPS receiver 501 to acquire satellite ephemeris data, the GPS receiver is configured to store the partial geotags 540 and to provide them to the communications interface 511 to be sent to the server 530 over a network, such as network 550. Network 550 can be any wired or wireless network connection including a direct connection, bus interconnection, wired or wireless network, or any other network including the Internet.

Server 530 includes a CPU 535 coupled with a memory 537. Server CPU 535 is configured to receive the partial geotags 540 over network 550 and satellite ephemeris data 538. In this embodiment, the server 530 can be positioned so as to have access to satellite ephemeris data 538. When the server 530 receives this data, the server can calculate a full geotag based on it. That is, the server 530 can calculate a full geotag based on the partial geotag measurements taken at an earlier point in time and satellite ephemeris data at a later point in time to extrapolate back the satellite state data at the earlier point in time. In one embodiment, the server 530 performs this calculation using a reverse EE algorithm described above, along with various components similar to those discussed earlier with respect to FIG. 3. In another embodiment, the server 530 performs this calculation by using an older ephemeris applicable to the time at which measurements corresponding to the partial geotag had been made. Server would get this older ephemeris data from its database or other server which maintains a database of older satellite ephemerides. Alternatively, the ephemeris data may be downloaded directly to the GPS device or downloaded from the server to the media device, which then sends the measurement data to the GPS receiver and receives computed position in return.

In addition to a GPS device or a server, a personal computer (PC) or smartphone may also be acceptable to perform the techniques described herein. In this case, the ephemeris data may either be uploaded from the GPS device or downloaded from the server, and the range measurement data uploaded from the media device to the PC where an algorithm can be stored to compute the full geotag. If a server is to be used, the measurement data can be uploaded from the GPS device to the PC as described above and the satellite ephemeris data downloaded from the server.

PC-based, server-based, or GPS-based computation requires the media device to transmit the stored measurement data using some predefined protocol. The reverse EE algorithm has been developed to allow the extension of validity time with modest degradation of position accuracy. In the preferred embodiment, it resides in the GPS receiver, but could be easily ported to a PC. These and other components described herein may be implemented as hardware, software, firmware, or hybrid circuits. Additionally, they may be special-purpose hardware constructed for specific purposes, or they may be general-purpose hardware selectively activated or configured by a computer program stored in memory. Such a computer program may be stored in computer-readable media. A computer-readable medium can be used to store software instructions, which when executed by a data processing system, cause the system to perform the various methods of this description. A computer-readable medium may include any mechanism to store information and provide that information in a form accessible by a computer or other machine (e.g., network device, mobile device, PDA, or any device having a processor). For example, a computer-readable medium may include any type of disk including floppy disks, hard drive disks (HDDs), solid-state devices (SSDs), optical disks, CD-ROMs, and magnetic-optical disks, ROMs, RAMs, EPROMs, EEPROMs, other flash memory, magnetic or optical cards, pen drives, DVDs, or any other type of physical media suitable for storing instructions in an electronic format.

Although the methods and apparatus of the present invention have been described with reference to GPS satellites, it will be appreciated that the teachings are equally applicable to positioning systems which utilize a combination of satellites and pseudolites. Pseudolites are ground based transmitters that broadcast a PN code (similar to the GPS signal) which may be modulated on an L-band carrier signal, generally synchronized with GPS time. As used herein, the term "satellite" is intended to also include pseudolites or equivalents of pseudolites, and the term "GPS signals" is intended to include GPS-like signals from pseudolites or equivalents.

In addition, embodiments described herein may be used to calculate a variety of positioning information. For example, positioning information can be determined using a wide variety of sensors such as accelerometers, gyroscopes, and magnetometers, for example. A characteristic of these devices is the need for calibration. When they lack calibration information, they resemble the GPS receiver described above lacking state information. Measurements are possible without the calibration information, but the resulting position is either impossible to calculate or at least unreliable. Also, like satellite state information, the calibration information can arrive some time after these measurements are made. In such embodiments, the term "partial geotag" is defined to include calibration data for one or more required sensors such as accelerometers, gyroscopes, and magnetometers, or geographic location of positioning sources. Further, positioning information can be inferred from the presence of other radio sources like Wi-Fi hot spots, cell towers, etc. If the GPS device is capable of using these sources, it will need access to a database identifying the geographic location of the source. It is conceivable that access to the databases could be delayed until beyond a reasonable time period, also requiring the use of delayed geotagging in these cases.

In the preceding discussion the techniques of calculating a delayed geotag have been described with reference to application of the United States Global Positioning System (GPS). It should be evident, however, that these methods are equally applicable to similar satellite systems, and in particular, the Russian Glonass system and the European Galileo system. The term "GPS" used herein includes such alternative satellite positioning systems. Throughout the foregoing description, for the purposes of explanation, numerous specific details were set forth in order to provide a thorough understanding of the invention. It will be apparent, however, to one skilled in the art that the invention may be practiced without some of these specific details. Although various embodiments which incorporate the teachings of the present invention have been shown and described in detail herein, those skilled in the art can readily devise many other varied embodiments that still incorporate these techniques. Embodiments of the invention may include various operations as set forth above or fewer operations or more operations; or operations in an order, which is different from the order described herein. Accordingly, the scope and spirit of the invention should be judged in terms of the claims which follow as well as the legal equivalents thereof.

What is claimed is:

1. A Global Positioning System (GPS) receiver configured to provide a geotag comprising:
   a wireless receiver configured to receive satellite state data and satellite range measurements from a plurality of satellites;
   a communications interface in communication with a media device and configured to:
      receive polling signals from the media device, the polling signals inquiring whether satellite state data is acquired; and
      send a status response signal upon reception of each polling signal, the status response signal indicating whether the satellite state data is acquired;
   a position engine configured to:
      receive the satellite range measurements from one of a minimum number of at least four satellites at a first point in time when the satellite state data from the one satellite is unavailable;
      receive the satellite state data from one or more of the minimum number of satellites other than the one satellite at the first point in time;
      calculate, for the one satellite for which only the satellite range measurements were received, the satellite state data at the first point in time based on satellite state data received for the one satellite at a second, later point in time using an algorithm to extrapolate the satellite state data at the second, later point in time back to the first point in time when the satellite range measurements were made; and
      calculate a full geotag using the calculated satellite state data for the one satellite at the first point in time, the satellite state data received at the first point in time for all of the other minimum number of satellites, and the satellite range measurements.

2. The GPS receiver of claim 1, wherein the position engine includes a satellite state engine and a GPS position engine.

3. The GPS receiver of claim 2, wherein the satellite state engine is configured to calculate the satellite state data at the first point in time based on the satellite state data received at the second, later point in time using a reverse extended ephemeris algorithm.

4. The GPS receiver of claim 1, wherein the position engine is further configured to:
   receive satellite range measurements from another one of the minimum number of satellites at the first point in time when the satellite state data from the another satellite is unavailable;
   calculate, for the another satellite for which only the satellite range measurements were received, the satellite state data at the first point in time based on satellite state data received for the another satellite at a third, later point in time using an algorithm to extrapolate the satellite state data at the third, later point in time back to the first point in time when the satellite range measurements were made, wherein the third, later point in time is later than the second, later point in time; and
   calculate a full geotag using the calculated satellite state data at the third, later point in time and the satellite range measurements, wherein calculating the full geotag includes performing a position fix using the calculated satellite state data for the one satellite, the calculated satellite state data for the another satellite, and the satellite state data received at the first point in time for the other of the minimum number of satellites.

5. The GPS receiver of claim 1, wherein the communications interface is configured to:
   receive a geotag request from the media device at the first point in time, the geotag to be associated with a particular instance of media in the media device; and
   send the geotag to the media device in response to the geotag request, wherein the full geotag is sent to the media device when signal conditions permit the satellite state data to be acquired within an amount of time, and a partial geotag is sent to the media device when signal conditions do not permit the satellite state data to be acquired within the amount of time.

6. The GPS receiver of claim 1, wherein the media device is configured to store the full or partial geotags with an associated instance of media.

7. The GPS receiver of claim 6, wherein the media device is configured to store the full or partial geotags into metadata of the associated instance of media.

8. The GPS receiver of claim 1, wherein the GPS receiver pro-actively alerts the media device when new satellite state data has become available.

9. The GPS receiver of claim 1, wherein the wireless receiver is further configured to download the satellite state data at the second, later point in time when the signal conditions permit.

10. The GPS receiver of claim 1, wherein the satellite state data includes satellite ephemeris data.

11. A method of calculating a geotag comprising:
   receiving a geotag request from a media device at a first point in time, the geotag to be associated with a particular instance of media in the media device;
   sending the geotag to the media device in response to the geotag request, wherein a full geotag is sent to the media device when signal conditions permit satellite state data for a minimum number of at least four satellites to be acquired by a Global Positioning System (GPS) device within an amount of time, and wherein a partial geotag is sent to the media device when signal conditions do not permit the satellite state data for one of the minimum number of satellites to be acquired by the GPS device within the amount of time, wherein the partial geotag includes pseudorange measurements at the first point in time;

receiving polling signals from the media device, the polling signals inquiring whether the satellite state data is acquired;

sending a status response signal upon reception of each of the polling signals, the status response signal comprising a notification signal when the satellite state data is acquired at a second, later point in time;

receiving the partial geotag from the media device in response to the notification signal;

calculating the satellite state data for the one satellite at the first point in time by extrapolating from the satellite state data acquired at the second, later point in time;

calculating the full geotag using the partial geotag, the satellite state data received at the first point in time for the one or more of the minimum number of satellites other than the one satellite, and the calculated satellite state data for the one satellite at the first point in time extrapolated from the satellite state data acquired at the second, later point in time; and sending the full geotag back to the media device.

12. The method of claim 11, wherein the full geotag is calculated from the partial geotag and the satellite state data using a reverse extended ephemeris algorithm to extrapolate the satellite state data back in time to the first point in time.

13. The method of claim 11, wherein the media device is configured to store the full or partial geotag with the associated instance of media.

14. The method of claim 11, further comprising downloading the satellite state data when the signal conditions permit.

15. The method of claim 11, further comprising:
sending a first message identifier to the media device when providing the full geotag to the media device; and
sending a second message identifier to the media device when providing only the partial geotag to the media device, wherein the media device is configured to distinguish between receiving the full geotag and the partial geotag based on the first and second message identifiers.

16. A method of calculating a geotag comprising:
receiving satellite range measurements from a minimum number of at least four satellites at a first point in time when satellite state data for one of the minimum number of satellites cannot be acquired by a Global Positioning System (GPS) device within an amount of time;
receiving polling signals from a media device, the polling signals inquiring whether the satellite state data is acquired;
sending a status response signal upon reception of each of the polling signals, the status response signal indicating whether the satellite state data is acquired;
calculating, for the one satellite for which only satellite range measurements were received at the first point in time, the satellite state data at the first point in time based on satellite state data received by the GPS device at a second, later point in time when the satellite state data for the one satellite becomes available using an algorithm to extrapolate the satellite state data at the second, later point in time back to the first point in time when the satellite range measurements were made; and
calculating a full geotag using the calculated satellite state data for the one satellite, the satellite state data received at the first point in time for all of the other minimum number of satellites, and the satellite range measurements at the first point in time.

17. The method of claim 16, further comprising providing the full geotag to the media device when signal conditions permit the satellite state data for the minimum number of satellites to be acquired within the amount of time, and providing a partial geotag to the media device when signal conditions do not permit the satellite state data for the minimum number of satellites to be acquired within the amount of time.

18. The method of claim 16, wherein the satellite range measurements include satellite pseudorange measurements.

19. The method of claim 16, further comprising:
sending a first message identifier to the media device when providing the full geotag to the media device; and
sending a second message identifier to the media device when providing only a partial geotag to the media device, wherein the media device is configured to distinguish between receiving the full geotag and the partial geotag based on the first and second message identifiers.

20. A system for calculating geotags using past satellite range measurements with current satellite state data, the system comprising:
a media device;
a mobile device comprising a Global Positioning System (GPS) receiver and a communications interface in communication with the media device;
a server in communication with the mobile device via a network,
wherein the mobile device is configured to:
perform satellite range measurements at a first point in time when signal conditions do not permit acquisition of satellite state data from one or more of a minimum number of at least four satellites;
send the satellite range measurements for the minimum number of satellites to the server via the network;
receive polling signals from the media device, the polling signals inquiring whether the satellite state data has been acquired; and
send a status response signal upon reception of each polling signal, the status response signal indicating whether the satellite state data has been acquired;
and wherein the server is configured to:
calculate the satellite state data for the one or more satellites at the first point in time by extrapolating from the satellite state data acquired at respective second, later point in time, wherein the calculated satellite state data includes at least a velocity and an acceleration of the one or more satellites at the first point in time;
calculate a full geotag using the satellite range measurements at the first point in time, the satellite state data for the minimum number of satellites other than the one or more satellites acquired at the first point in time and the calculated satellite state data for the one or more satellites at the first point in time extrapolated from the satellite state data acquired at the respective second, later points in time; and
send the calculated full geotag to the mobile device via the network.

21. The system of claim 20, wherein the media device is configured to store geotags with associated instances of media within the media device.

22. The system of claim 21, wherein the mobile device is further configured to calculate the full geotag internally and provide it to the media device when the satellite state data from the minimum number of satellites is available, and to provide the full geotag from the server to the media device when the satellite state data from the minimum number of satellites is unavailable.

23. The system of claim 20, wherein the server is configured to calculate the full geotag using a reverse extended ephemeris algorithm.

* * * * *